(12) United States Patent
Hayashi et al.

(10) Patent No.: US 7,738,838 B2
(45) Date of Patent: Jun. 15, 2010

(54) NON-CONTACT RF ID SYSTEM COMMUNICATION METHOD, NON-CONTACT RF ID SYSTEM, TRANSMITTER, AND RECEIVER

(75) Inventors: Hitoshi Hayashi, Yokohama (JP); Masashi Shimizu, Yokohama (JP); Toshimitsu Tsubaki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 48 days.

(21) Appl. No.: 10/519,858

(22) PCT Filed: Jan. 14, 2004

(86) PCT No.: PCT/JP2004/000190
§ 371 (c)(1),
(2), (4) Date: Dec. 29, 2004

(87) PCT Pub. No.: WO2004/064346
PCT Pub. Date: Jul. 29, 2004

(65) Prior Publication Data
US 2005/0253716 A1    Nov. 17, 2005

(30) Foreign Application Priority Data
Jan. 15, 2003    (JP) .............................. 2003-007474

(51) Int. Cl.
*H04B 7/00*    (2006.01)
(52) U.S. Cl. .................... 455/41.2; 340/572.1; 341/173
(58) Field of Classification Search ................. 455/41.2
See application file for complete search history.

(56) References Cited

U.S. PATENT DOCUMENTS
4,373,154 A * 2/1983 Balme et al. .................. 341/58

(Continued)

FOREIGN PATENT DOCUMENTS
EP    967562 A2    12/1999

(Continued)

OTHER PUBLICATIONS

D. Friedman, et al., A Low-Power CMOS Integrated Circuit for Field-Powered Radio Frequency Identification Tags, IEEE, ISSCC97 SA. 17.5, 1997.

(Continued)

*Primary Examiner*—Duc Nguyen
*Assistant Examiner*—Zhiyu Lu
(74) *Attorney, Agent, or Firm*—Harness, Dickey & Pierce, P.L.C.

(57) ABSTRACT

A communication method for a noncontact RF ID system that uses a first waveform, a second waveform, and a third waveform, wherein the first waveform and the second waveform are formed by a basic waveform having one of a rising or falling state transition at the approximate center of the waveform, the third waveform is formed by a plurality of basic waveforms that have one state transition at the approximate center part of the waveform, and the third waveform generates one state transition only at the approximate center of the plurality of basic waveforms. In addition, communication is carried out by using the third waveform in place of the first waveform and the second waveform in the case in which communication is carried out using a first waveform and a second waveform and one state transition is generated outside the approximate center part of the basic waveform.

4 Claims, 14 Drawing Sheets

U.S. PATENT DOCUMENTS

| | | | |
|---|---|---|---|
| 5,058,141 A * | 10/1991 | Kem et al. | 375/368 |
| 2002/0030597 A1 * | 3/2002 | Muirhead | 340/572.1 |
| 2003/0011474 A1 * | 1/2003 | Ng | 340/568.1 |

FOREIGN PATENT DOCUMENTS

| JP | 54-13708 A | 2/1979 |
|---|---|---|
| JP | 10-13393 A | 1/1998 |
| JP | 11-355365 A | 12/1999 |

OTHER PUBLICATIONS

International Search Report for PCT/JP2004/000190; ISA/JPO; Mailed: Apr. 13, 2004.

* cited by examiner

WAVEFORM C(3)

WAVEFORM C(4)

RISING TRANSITION OCCURS AT THE JUNCTION

NON-CONTACT RF ID SYSTEM COMMUNICATION METHOD, NON-CONTACT RF ID SYSTEM, TRANSMITTER, AND RECEIVER

TECHNICAL FIELD

The present invention relates to a noncontact RF ID (Radio Frequency IDentification) system, and in particular relates to a communication method for a noncontact RF ID system, a noncontact RF ID system, a transmitter and a receiver that use a code that can separate the data and clock easily without lowering the data transmission speed.

BACKGROUND ART

In recent years, with the aim of strengthening information security, high value services, and automation, demand for replacing bar code systems that are applied to distribution systems and magnetic card systems for cashing, commuter passes, or the like, with automatic ID recognition systems that use an IC card or an IC tag, has been increasing. Among these systems, there are one in which the exchange of data and supply of power occurs without directly contacting the reader, that is, wirelessly, and such systems are referred to as "noncontact RF ID systems".

Noncontact RF ID systems are divided into a close coupling type, which is coupled to the reader, a proximity type, which is used separated by about 20 cm, and a remote type, which is used separated by about 50 cm or greater.

The close coupling type is used generally for credit cards or the like, while the proximity type is used for commuter passes, ID cards, and the like. Remote type is used for tags in logistic systems or the like. The close coupling and proximity types receive information and a power supply by using a magnetic field. The remote type receives supplies of these by radio waves. Among these three types of noncontact RF ID systems, as receiving power of the remote type is very weak in especially, the remote type has a development theme of a low power consumption operation and a highly efficient power supply.

FIG. 11 shows a configuration of a conventional noncontact RF ID system. The noncontact RF ID system provides a reader 1 and a transponder 2. The transponder 2 provides an antenna 2A, a DC power detecting circuit 200, a signal detecting circuit 201, an input amplifier 202, a clock generating circuit and a demodulator 203 that use a phase locked loop and a reference circuit, a control logic circuit 204, and a memory 205.

The DC power detecting circuit 200 provides a diode D1, a diode D2 for a power supply, and a capacitor C1 for power storage. The signal detecting circuit 201 provides a diode D1, a waveform detecting diode D3, a load capacitor C2, and an FET switch Q1.

In the above structure, an amplitude modulation signal that includes clock and data information is sent by the reader 1 to the transponder 2 via the antenna 1A. In the transponder 2, when the signal is received via the antenna 2A, an electrical charge is accumulated in the power accumulation capacitor C1, the voltage at both terminals of the capacitor C1 serves as an electromotive force, and the transponder 2 is activated.

The signal detected by the waveform detecting diode D3 in the signal detecting circuit 201 is divided into the data component and the clock component by the clock generating circuit and the demodulator 203, and processed by the control logic circuit 204. When the transponder 2 responds to the reader 1, the response is carried out by turning the FET switch Q1 ON and OFF, and modulating the impedance of the antenna 2A by using the load capacitor C2.

In the conventional noncontact RF ID system, for example, as is described in the following non-patent document 1, Manchester encoding is applied to the exchange of data between a transponder and a reader.

[Non Patent Document 1]
D. Friedman, et al., A Low-Power CMOS Integrated Circuit for Field-Powered Radio Frequency Identification Tags, IEEE, ISSCC97 SA. 17.5, 1997

FIG. 12A shows a waveform modulated by the Manchester encoding. The Manchester encoding assigns a code "1" to a transition from a high level (high voltage state) to a low level (low voltage state), and assigns a code "0" to a transition from a low level (low voltage state) to a high level (high voltage state).

Here, in the case in which the time intervals between the high level and the low level are not equal, that is, in the case in which the duty ratio is not 50%, a DC offset is generated by the data, and this is a significant cause of reading errors when the received signal level fluctuates. The Manchester encoding sets the time intervals between the high level and the low level equal, realizes a signal having a 50% duty ratio, does not generate a DC offset, and thereby realizes a code suitable for communication.

However, in the demodulation of the Manchester encoding in the conventional example described above, because the codes "0" and "1" are determined by the sequence of the appearance of the high level and low level states, it is necessary to detect each of the high and low level states.

In addition, as shown in FIG. 12B, because the intervals of the state transition timing of the fall and rise fluctuates corresponding to the data, a phase locked loop and an oscillator become necessary to generate the clock signal, and therefore the convergence of the clock takes time. To satisfy the locking conditions of the phase locked loop, it is necessary to cancel the fluctuations of the temperature, power supply voltage, device processes, and the like. Therefore, a complicated reference circuit becomes necessary, and the consumed current increases. In cases where the communication is temporarily stopped due to the influence of the state of the radio waves, there are the problems that the convergence of the clock takes time and a long locking time is required.

Another conventional noncontact RF ID system has been proposed in which the code is generated without complicated phase locked loops or oscillators, a reference clock for an integrated circuit on the transponder is generated, and a code that satisfies a duty ratio of 50% is used (refer, for example, to Japanese Unexamined Patent, First Publication No. H11-355365).

FIG. 13A shows the waveforms and codes used in communication with another conventional noncontact RF ID system. As shown in FIG. 13B, the time intervals of the rising of the waveforms that are transmitted or received are equal.

The transmitted and received waveforms are obtained by a combination of waveform A and waveform B. The waveform A is one that extends the high level state in the positive time direction by T/2 (where T is 1 cycle) from the point in time that the waveform rises and extends the low level state in the negative time direction by T/2. The waveform B is one that maintains the high level state in the positive time direction for time t1 from the point in time that the waveform rises, maintains a low level state for time t2 until reaching the end point of the waveform, maintains the low level state in the negative time direction for t1 from the point in time that the waveform rises, and maintains the high level state for the time t2 until reaching the starting point of the waveform.

It is assumed that t1+t2=T/2, and both waveforms A and B necessarily have a rising state transition present at the center. If each of the independent waveforms A and B is respectively assigned "0" and "1", then as shown in FIG. 14, when the waveforms B continue in succession, a rising state transition occurs at the junction between the waveforms, and thus associating the rising timing with one unit of data becomes difficult. In the case in which the waveforms B continue in succession, a rising state transition at the junction between the waveforms occurs because the waveform B starts at a high level and ends at a low level.

In another conventional examples, a code "0" is assigned when the waveforms A continue in succession twice, while a code "1" is assigned when the waveform A continues in succession after the waveform B. In this case, two successive waveforms A associated with code "0" start at a low level and end at a high level, and successive waveforms B and A associated with the code "1" start at a high level and end at a high level. The four combinations of all possible junctions, "00", "01", "10" and "11", are shown in FIG. 15A to FIG. 15D.

In the case of the codes "00" and "10", a falling transition occurs at the junction between the two successive waveforms. In the case of the codes "01" and "11", the two junctions of the two successive waveforms are maintained at high level. Even if waveforms associated with sequence of arbitrary codes "0" and "1" are arranged, no rising transition occurs at the junction between the waveforms. Therefore, a rising transition always occurs only at the center points of each of the waveforms A and B. By using a circuit that detects the rising transition, a clock signal that is in synchronism with the data can be easily generated.

As shown in FIG. 16, the combinations of waveforms A and B can have many variations, such as the case in which when the waveforms A and B are switched and waveform B continues in succession after waveform A, then a code "1" is applied. A combination in which the time interval of the rise is constant, is realized by a combination of a waveform pattern that starts at a low level and end at a high level and a waveform pattern that starts at a low level or a high level and ends at a level identical to the starting level.

As has been described above, in another conventional example, by combining two types of waveforms having a duty ratio of 50%, the time intervals of the rising and falling times are made equal, and at the same time, it is possible to send the information for codes "1" and "0". If the state transition that occurs at equal time intervals is used as a trigger, a clock that is in synchronism with the data can be easily obtained without using a phase locked loop.

However, when assigning the codes "0" and "1" to each of the waveforms A and B independently, as shown in FIG. 14, when the waveforms B continue in succession, a rising state transition occurs at the junction between the two waveforms B, and thus there are problems in that associating the rising timing with one unit of data is difficult, and the transmission efficiency due to the encoding declines.

In consideration of the problems described above, it is an object of the present invention to provide a communication method for a noncontact RF ID system, a noncontact RF ID system, and a transmitter and receiver that improve the transmission efficiency by encoding.

DISCLOSURE OF INVENTION

The communication method for a noncontact RF ID system of the present invention uses a first waveform, a second waveform, and a third waveform, wherein: one of the rising timing and the falling timing of the waveform output when communicating by using the first waveform, the second waveform, and the third waveform, becomes periodic.

The first waveform and the second waveform may be formed by a basic waveform that has one of a rising state transition and a falling state transition at the approximate center part of the waveform; the third waveform may be formed by a plurality of basic waveforms that have the one state transition at the approximate center part of the waveform, and the third waveform may be formed such that the one state transition occurs only at the approximate center part of the plurality of the waveforms. In the case in which the state transition occurs outside the approximate center of the basic waveform when communicating by using the first waveform and the second waveform, communication may be carried out by using the third waveform in place of the first waveform and the second waveform.

The third waveform may be a waveform that is used in place of m waveforms (here, m is a natural number equal to or greater than 2) when one of the first waveform and the second waveform continues in succession and an identical rising or falling state transition which is occurred at the approximate center part of the waveform is occurred at the connection part of the waveforms, and furthermore, a combination of the first waveform and the second waveform that includes a connection part of the waveforms that produces the state transition, consists of m waveforms.

In the case in which the state transition is rising, the first waveform may be a waveform that maintains a low level in the negative time direction for T/2 from the point in time that the waveform first rises, which is the center point of the waveform, and maintains a high level state for T/2 in the positive time direction from this center point; the second waveform may be a waveform that maintains a high level state in the positive time direction for t1 from the point in time that the waveform first rises, which is the enter point of the waveform, maintains a low level state for time t2 until the end point of the waveform, maintains a low level state in the negative time direction for time t1 from the center point of the waveform, and maintains a high level state for time t2 until the starting point of the waveform (here, t denotes time, T denotes one cycle of the first and second waveforms, and t1+t2=T/2); and the third waveform is a C(2n) waveform which, in the case in which m=2n, maintains a high level state in the positive time direction for t6 from the point in time that the waveform first rises; maintains a low level state in the negative time direction for t3 from the point in time that the waveform first rises; maintains a high level state for time t4 until the starting point of the waveform; maintains a high level state in the positive time direction for t{2(n−k)+6} from the point in time that the waveform rises for the (n+1−k)th time; maintains a low level state for t{2(n−k)+3} in the negative time direction from the point in time that the waveform rises for the (n+1−k)th time; maintains a high level state in the positive time direction for T/2 from the point in time that the waveform rises for the nth time; maintains a low level state in the negative time direction for t{2(n−1)+3} from the point in time that the waveform rises for the nth time; maintains a high level state in the positive time direction for t{2(n−1)+3} from the point in time that the waveform rises for the (n+1)th time; maintains a low level state in the negative time direction for T/2 from the point in time that the waveform rises for the (n+1)th time; maintains a high level state in the positive time direction for t{2(n−k)+3} from the point in time that the waveform rises for the (n+k)th time; maintains a low level state in the negative time direction for t{2(n−k)+6} from the point in time that the waveform rises for the (n+k)th time; maintains a low level state in the negative time direction for t6 from the point in time that the waveform rises the last time; maintains a high level state in the positive time direction for t3 from the point in time that the waveform rises the last time; and maintains a low level state for time t4 until the end point of the waveform, where n and k are natural numbers; n≧k≧1; t is time; T is one cycle of the first and second waveforms; and t3+t4=T/2; t{2(n−k)+5}+t{2(n−k)+6}=T (when n and k≧2); and in the case in which m=2n+1, the third waveform may be a C(2n+1) waveform that maintains a high level state in the positive time direction for t6 from the point in time that the waveform first rises; maintains a low level state in the negative time direction for t3 from the point in time that the waveform first rises; maintains a high level state for t4 from the starting point of the waveform; maintains a high level state in the positive time direction for t{2(n−k)+6} from the point in time that the waveform rises for the (n+1−k)th time; maintains a low level state in the negative time direction for t{2(n−k)+3} from the point in time that the waveform rises for the (n+1−k)th time; maintains a high level state in the positive time direction for t{2(n−1)+5} from the point in time that the waveform rises for the (n+1)th time; maintains a low level state in the negative time direction for t{2(n−1)+5} from the point in time that the waveform rises for the (n+1)th time; maintains a high level state in the positive time direction for t{2(n−k)+3} from the point in time that the waveform rises for the (n+1+k)th time; maintains a low level state in the negative time direction for t{2(n−k)+6} from the point in time that the waveform rises for the (n+1+k)th time; maintains a low level state in the negative time direction for t6 from the point in time that the waveform rises the last time; maintains a high level state in the positive time direction for time t3 from the point in time that the waveform rises the last time; and maintains a low level state for t4 until the end point of the waveform; (where n and k are natural numbers, n≧k≧1, t is time, T is one cycle of the first and second waveforms, t3+t4=T/2, and t{2(n−k)+5}+t{2(n−k)+6}=T).

On the other hand, in the case in which the state transition is a falling state transition, the first waveform may be an inverted waveform that maintains a low level in the negative time direction for T/2 from the point in time that the waveform first rises, which is the center point of the waveform, and maintains a high level state for T/2 in the positive time direction from this center point; the second waveform is an inverted waveform that maintains a high level state in the positive time direction for t1 from the point in time that the waveform first rises, which is the center point of the waveform, maintains a low level state for time t2 until the end point of the waveform, maintains a low level state in the negative time direction for time t1 from the center point of the waveform, and maintains a high level state for time t2 until the starting point of the waveform (here, t denotes time, T denotes one cycle of the first and second waveforms, and t1+t2=T/2); and the third waveform may be an inverted C(2n) waveform which, in the case in which m=2n, maintains a high level state in the positive time direction for t6 from the point in time that the waveform first rises; maintains a low level state in the negative time direction for t3 from the point in time that the waveform first rises; maintains a high level state for time t4 until the starting point of the waveform; maintains a high level state in the positive time direction for t{2(n−k)+6} from the point in time that the waveform rises for the (n+1−k)th time; maintains a low level state for t{2(n−k)+3 } in the negative time direction from the point in time that the waveform rises for the (n+1−k)th time; maintains a high level state in the positive time direction for T/2 from the point in time that the waveform rises for the nth time; maintains a low level state in the negative time direction for t{2(n−1)+3} from the point in time that the waveform rises for the nth time; maintains a high level state in the positive time direction for t{2(n−1)+3} from the point in time that the waveform rises for the (n+1)th time; maintains a low level state in the negative time direction for T/2 from the point in time that the waveform rises for the (n+1)th time; maintains a high level state in the positive time direction for t{2(n−k)+3} from the point in time that the waveform rises for the (n+k)th time; maintains a low level state in the negative time direction for t{2(n−k)+6} from the point in time that the waveform rises for the (n+k)th time; maintains a low level state in the negative time direction for t6 from the point in time that the waveform rises the last time; maintains a high level state in the positive time direction for t3 from the point in time that the waveform rises the last time; and maintains a low level state for time t4 until the end point of the waveform, where n and k are natural numbers; n≧k≧1; t is time; T is one cycle of the first and second waveforms; and t3+t4=T/2; t{2(n−k)+5}+t{2(n−k)+6}=T (when n and k≧2); and in the case in which m=2n+1, the third waveform is an inverted C(2n+1) waveform that maintains a high level state in the positive time direction for t6 from the point in time that the waveform first rises; maintains a low level state in the negative time direction for t3 from the point in time that the waveform first rises; maintains a high level state for t4 from the starting point of the waveform; maintains a high level state in the positive time direction for t{2(n−k)+6} from the point in time that the waveform rises for the (n+1−k)th time; maintains a low level state in the negative time direction for t{2(n−k)+3} from the point in time that the waveform rises for the (n+1−k)th time; maintains a high level state in the positive time direction for t{2(n−1)+5} from the point in time that the waveform rises for the (n+1)th time; maintains a low level state in the negative time direction for t{2(n−1)+5} from the point in time that the waveform rises for the (n+1)th time; maintains a high level state in the positive time direction for t{2(n−k)+3} from the point in time that the waveform rises for the (n+1+k)th time; maintains a low level state in the negative time direction for t{2(n−k)+6} from the point in time that the waveform rises for the (n+1+k)th time; maintains a low level state in the negative time direction for t6 from the point in time that the waveform rises the last time; maintains a high level state in the positive time direction for time t3 from the point in time that the waveform rises the last time; and maintains a low level state for t4 until the end point of the waveform; (where n and k are natural numbers, n≧k≧1, t is time, T is one cycle of the first and second waveforms, t3+t4=T/2, and t{2(n−k)+5}+t{2(n−k)+6}=T).

Communication may be carried out by assigning a code "1" and a code "0" to the first waveform and the second waveform, and assigning a combination of the code "1" and the code "0" associated with the combination to the third waveform, which is used in place of the combination of the first waveform and the second waveform.

A noncontact RF ID system of the present invention which uses the communication method may includes a clock generating device that generates an internal clock such that the state transition of the internal clock is generated in synchronism with the timing of the rise of the modulating signal; and a logic circuit that operates in synchronism with the state transition of the clock generated by the clock generating device.

A transmitter of the present invention forms and transmits a first waveform, a second waveform, and a third waveform, wherein: the first waveform and the second waveform are formed by a basic waveform that has a state transition that either rises or falls at the approximate center part of the waveform; the third waveform is formed by a plurality of basic waveforms that have one state transition at the approximate center part of the waveform and the one state transition is generated only at the approximate center part of the plurality of basic waveforms; and transmission is carried out by using the third waveform in place of the first waveform and the second waveform in the case in which transmission is carried out using the first waveform and the second waveform and in the case in which the one state transition is generated outside the approximate center part of the waveform.

A receiver of the present invention receives the first waveform and the second waveform, and the third waveform, wherein: the first waveform and the second waveform are formed by a basic waveform that has a state transition that either rises or falls at the approximate center part of the waveform; the third waveform is formed by a plurality of basic waveforms that have one state transition at the approximate center part of the waveform and the one state transition is generated only at the approximate center part of the plurality of basic waveforms; and in the case in which the third waveform is received, the receiver recognizes the reception of a combination of the first waveform and the second waveform in which the one state transition has occurred outside the approximate center of the basic waveform.

According to the present invention, the first waveform and the second waveform are formed by the basic waveform that has one of the rising or falling state transitions at the approximate center part of the waveform, and the third waveform is formed by a plurality of basic waveforms having one state transition at the approximate center part of the waveform and the one state transition occurs only at the approximate middle of the plurality of basic waveforms. In the case in which communication is carried out by using the first waveform and the second waveform, if one state transition is generated outside the approximate center part of the plurality of basic waveforms, for example, if the second waveform continues in succession, then transmission is carried out by assigning on the transmission side the third waveform that does not have a rising (or falling) state transition at the junction between the waveforms in place of the second waveform, and on the receiving side, in the case in which the third waveform is received, resolution is carried out by recognizing the reception of successive second waveforms and demodulating them, and thereby it is possible to assign individually the first waveform and second waveform a code "0" and "1", and thereby it becomes possible to associate a rising (or falling) timing with one unit of data. Thus, by using a circuit that detects the rising (or falling) transition, it is possible to generate easily a clock signal that is in synchronism with the data.

BEST MODE FOR CARRYING OUT THE INVENTION

Figure 1:
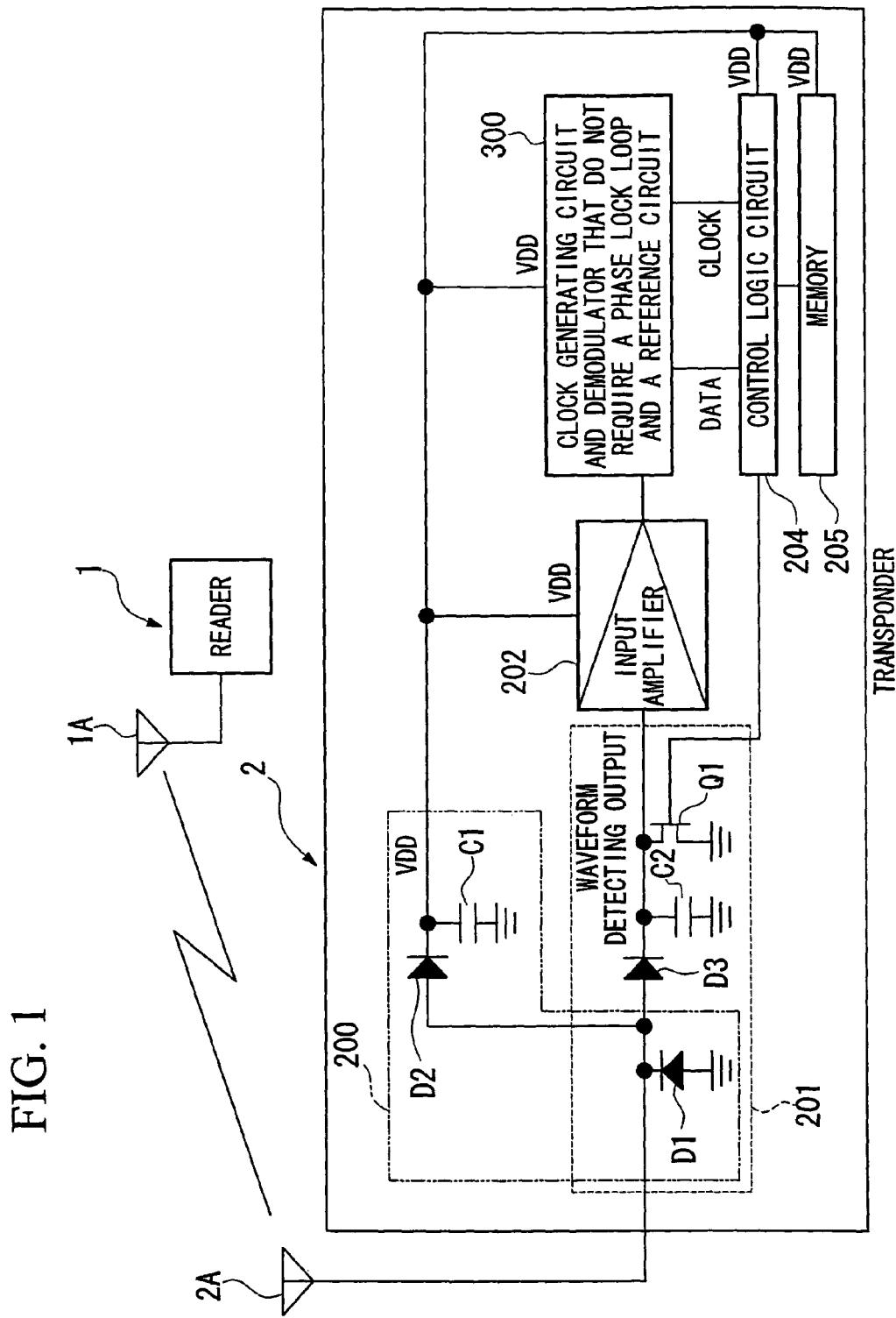
FIG. 1 is a block diagram showing the structure of a noncontact RF ID system according to an embodiment of the present invention.

Below, embodiments of the present invention will be explained in detail with reference to the drawings. The configuration of the noncontact RF ID system of the present embodiment is shown in FIG. 1. As shown in the drawing, the noncontact RF ID system of the present embodiment provides a reader 1 that reads data and a transponder 2 that receives a signal that includes data and a clock signal transmitted from the reader 1. The transponder 2 provides an antenna 2A, a DC power detecting circuit 200, a signal detecting circuit 201, an input amplifier 202, a clock generating circuit and demodulator 300 that do not require a phase locked loop and a reference circuit, a control logic circuit 204, and a memory 205.

The DC power detecting circuit 200 provides a diode D1, a power source diode D2, and a power accumulating capacitor C1. The signal detecting circuit 201 provides a diode D1, a waveform detecting diode D3, a load capacitor C2, and an FET switch Q1.

According to the configuration described above, an amplitude modulated signal that includes the clock and data information is transmitted to the transponder 2 via the antenna A1. When the transponder 2 receives the signal via the antenna 2A, the load is accumulated in the power accumulating capacitor C1 and the transponder 2 is activated using voltage between the both terminals of the capacitor C1 as the electric power.

The signal detected by the waveform detecting diode D3 in the signal detecting circuit 201 is divided into the data and the clock by the clock generating circuit and the demodulator 300, and are processed by the control logic circuit 204. When the transponder 2 responds to the reader 1, the FET switch Q1 is turned ON/OFF, and the impedance of the antenna 2A is modulated by using the load capacitor C2.

Figure 11:
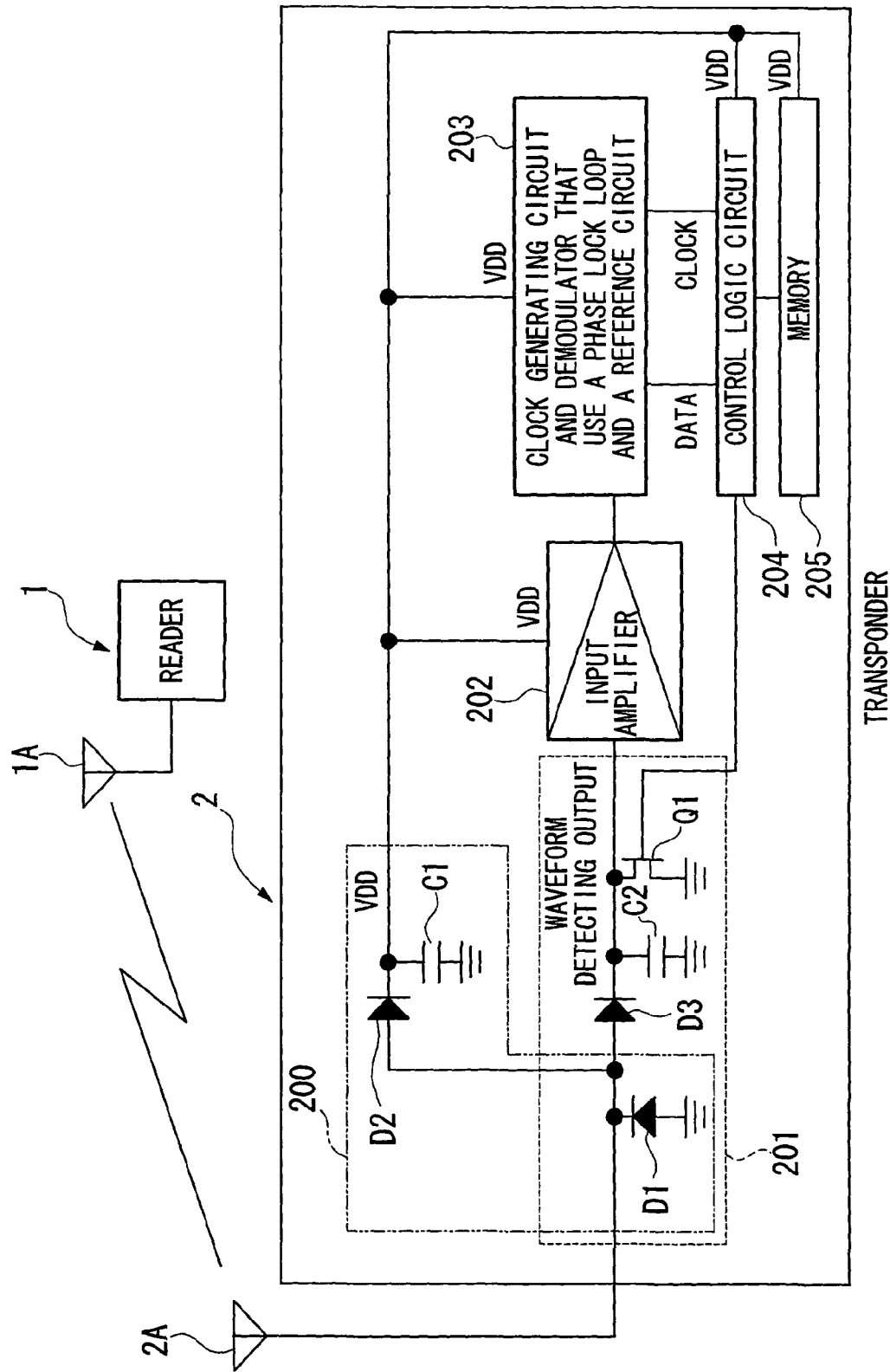
FIG. 11 is a block diagram showing a configuration of a conventional example of a noncontact RF ID system.
Figure 12A:
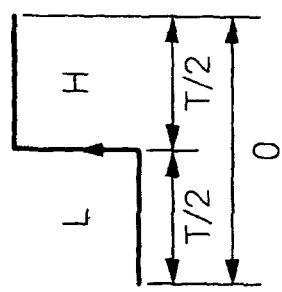
FIGS. 12A and 12B are drawings showing the Manchester encoding waveform used in the noncontact RF ID system of the conventional example.
Figure 12B:
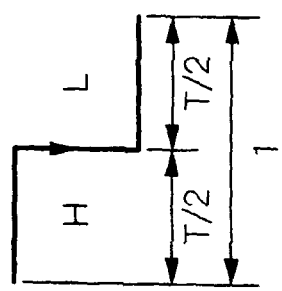
Figure 12B:
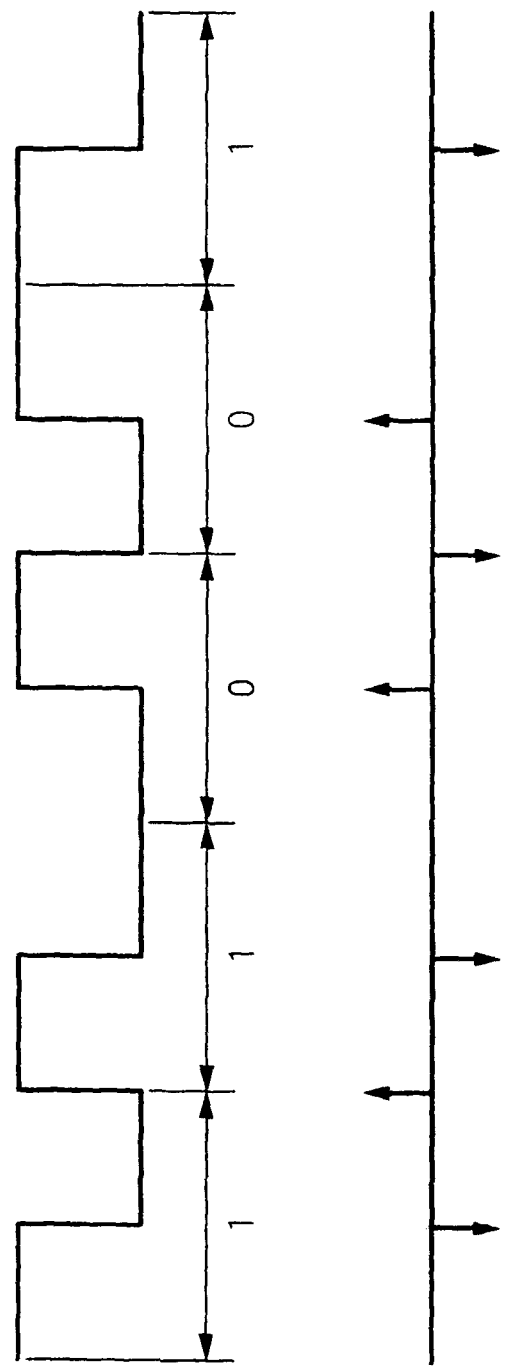
Figure 13A:
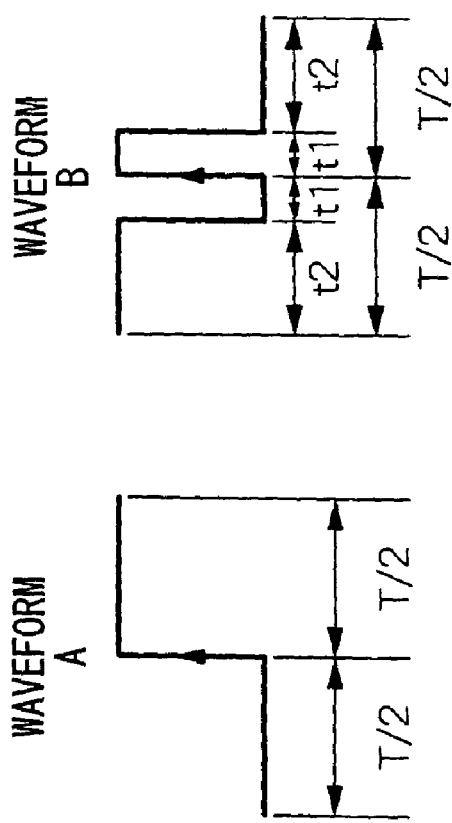
FIGS. 13A and 13B are drawings showing waveforms and codes used in the noncontact RF ID system of another conventional example.
Figure 13B:
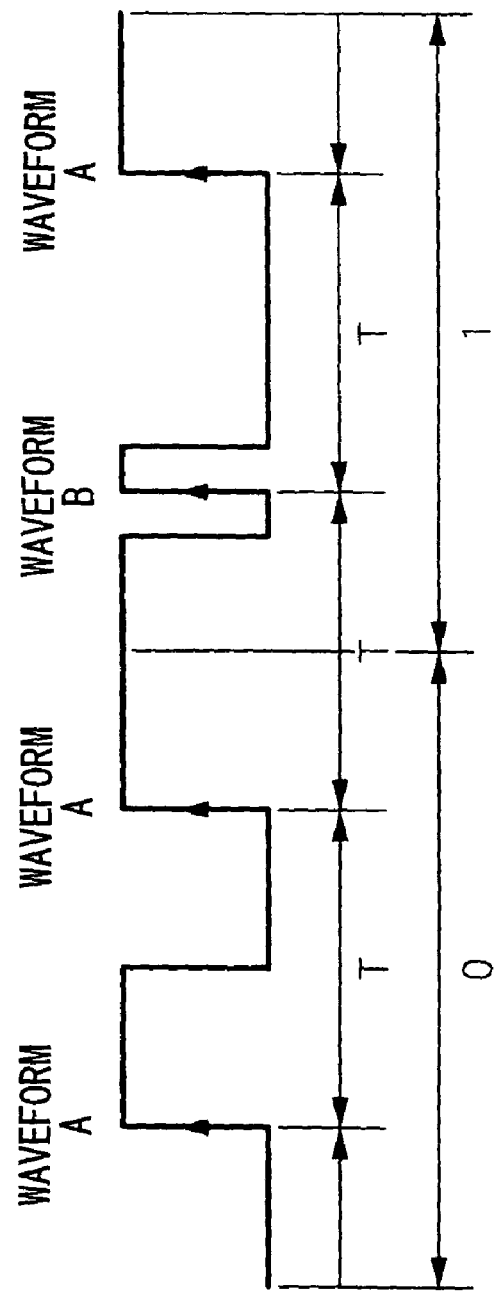

The point on which the configuration of the noncontact RF ID system of the present embodiment differs from that of the conventional noncontact RF ID system shown in FIG. 11 is mainly that in place of a clock generating circuit and demodulator 203 that use a phase locked loop and reference circuit, a clock generating circuit and demodulator 300 that does not require a phase locked loop and a reference circuit is used. The other configurations are identical.

Figure 2A:
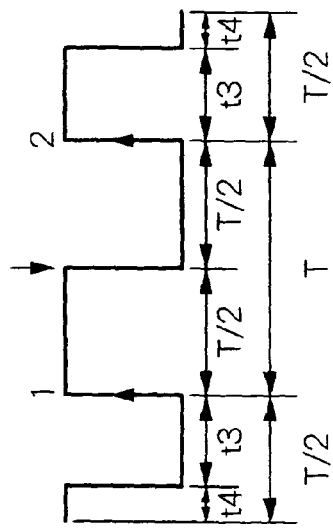
FIGS. 2A and 2B are drawings showing an example of a code sequence when assigning codes to each type of waveform and each waveform used in the noncontact RF ID system according to the embodiment of the present invention.
Figure 2A:
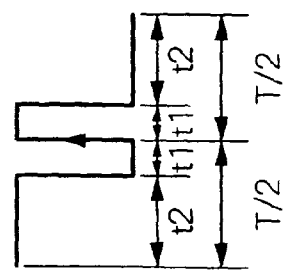
Figure 2A:
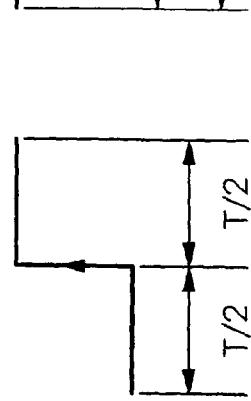
Figure 2B:
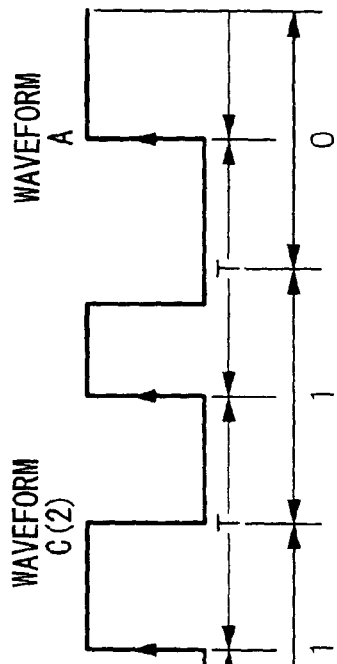
Figure 2B:
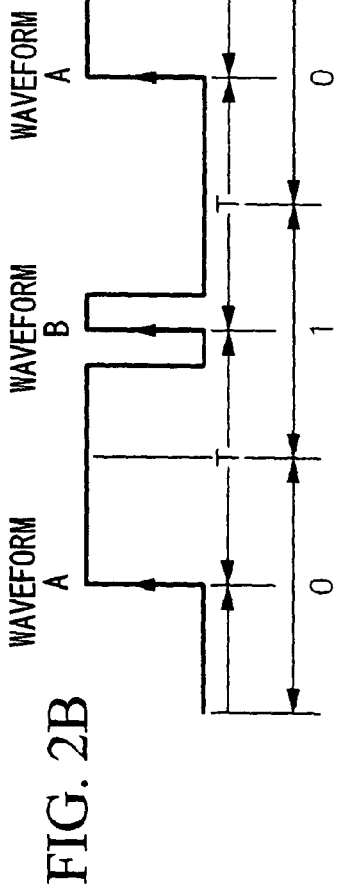

FIGS. 2A and 2B show the waveform used in the noncontact RF ID system of the present embodiment and the waveform of the code sequence (data) communicated by assigning codes to these waveforms. In the present embodiment, the rising interval of the transmitted and received waveforms are equal intervals. The transmitted and received waveforms are obtained by combining the waveform A and waveform B shown in FIG. 2A.

Here, the waveform A is a waveform that extends the high level state in the positive time direction by T/2 (where T is the time for one cycle), and the low level state in the negative time direction by T/2, from the point in time that waveform rises.

The waveform B maintains the high level state in the positive time direction for time t1 from the point in time that the waveform rises, maintains the low level state for time t2 until the end point of the waveform, maintains the low level state in the negative time direction for time t1 from the point in time that the waveform rises, and maintains a high level state for time t2 until the starting point of the waveform.

Figure 14:
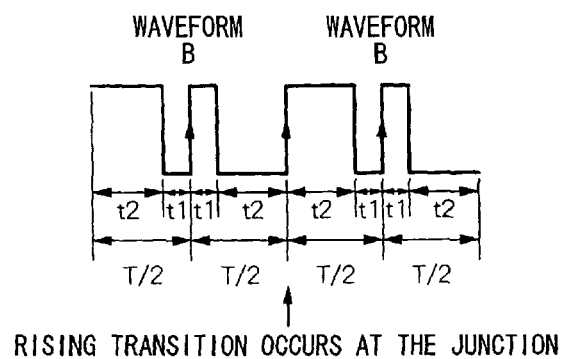
FIG. 14 is an explanatory drawing showing problems in the case a waveform B continues in succession in another conventional example.
Figure 15A:
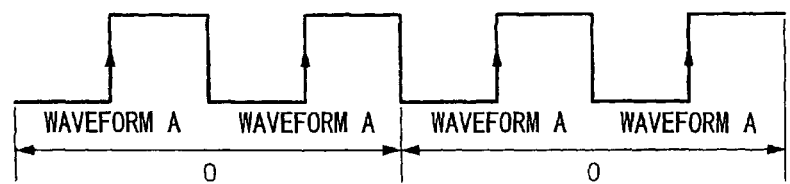
FIGS. 15A to 15D are explanatory drawings showing the state of the junction of the codes used in another conventional example.
Figure 15B:
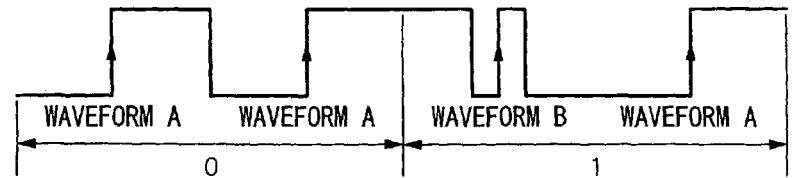
Figure 15C:
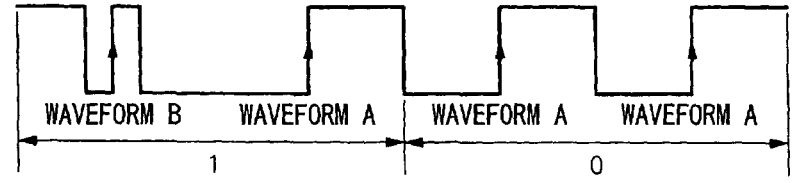
Figure 15D:
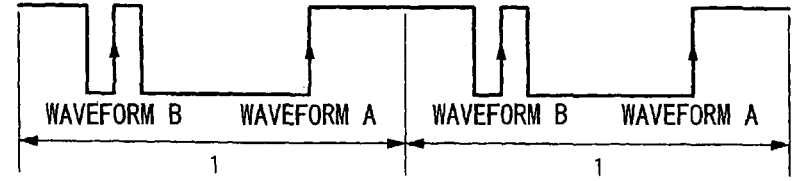
Figure 16:
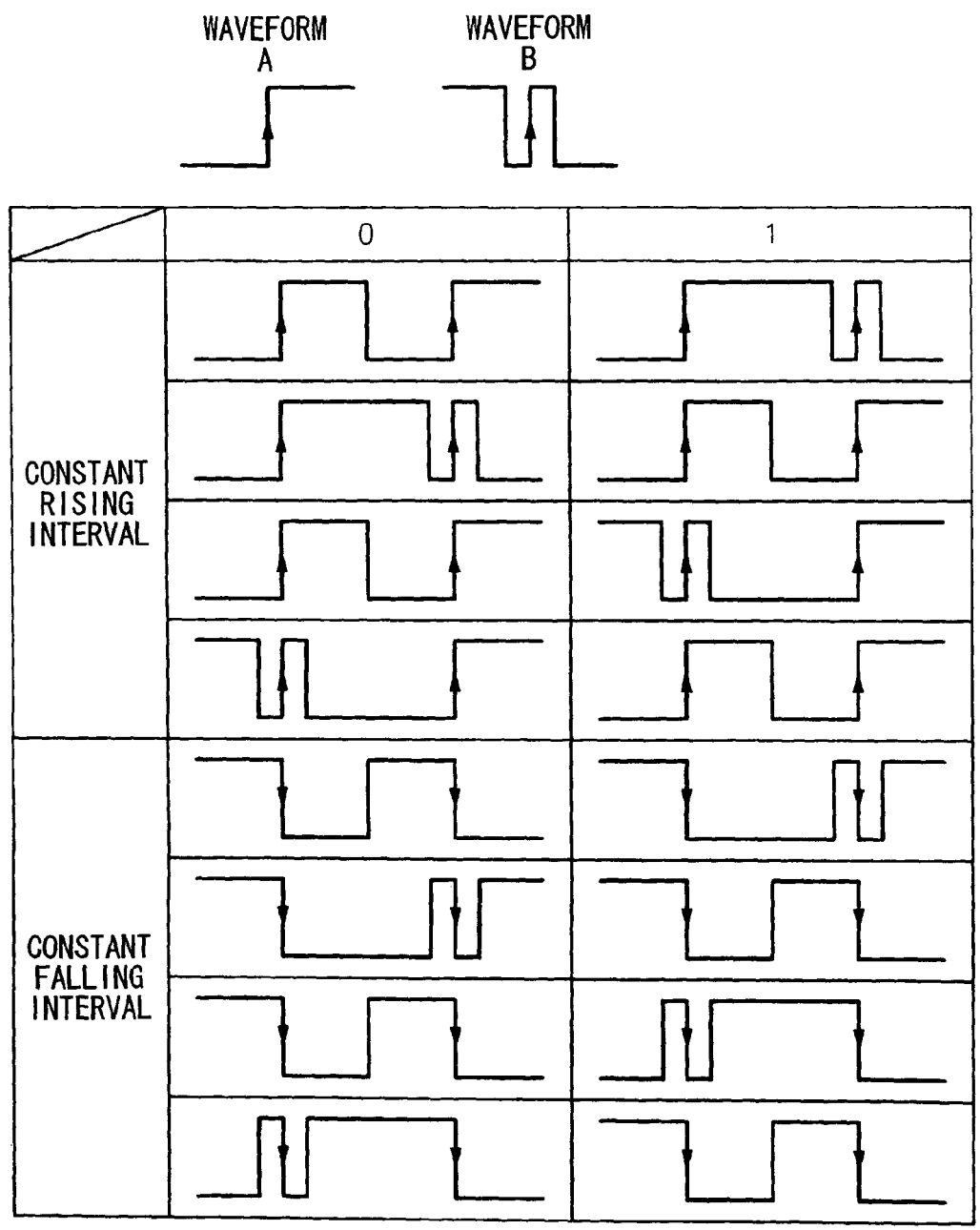
FIG. 16 is a drawing showing the code list of another conventional example.

It is assumed that t1+t2=T/2 and a rising state transition is always present at the center of each of the waveforms A and B. Note that when codes "0" and "1" are assigned separately to the respective waveforms A and B, if the waveform B continues in succession as shown FIG. 14, the rising state transition occurs at the junction between the waveforms, and there is the problem associating the rising timing with a unit of data becomes difficult.

In the present embodiment, when the waveform B continues in succession, at the transmitting side a new waveform C, in which a rising state transition does not occur at the junction between the waveforms, is assigned and transmitted in place of the continuing waveforms B. At the receiving side, when the waveform C is received, it is recognized that the successive waveforms B were received and demodulation is carried out. In the example of the code sequence shown in FIG. 2B, the waveform A is assigned code "0" and the waveform B is assigned code "1".

The waveform C(2) is a waveform that is used in place of the two successive waveforms B, and maintains a high level state in the positive time direction for T/2 from the point in time that the waveform first rises, maintains a low level state in the negative time direction for t3, maintains a high level state for time t4 until the start point of the waveform, maintains a low level state in the negative time direction for T/2 from the point in time that the waveform rises the last time, maintains a high level state in the positive direction for t3, and maintains a low level state for time t4 until the end point of the waveform.

It is assumed that t3+t4=T/2, and by assigning a waveform C(2) in place of two successive waveforms B on the transmission side, a rising transition does not occur at the junction between the waveforms, and thus it is possible to make an association between the rising timing and a unit of data. Thereby, by using a circuit that detects the rising transition, it is possible to generate easily a clock signal that is in synchronism with the data.

Figure 3:
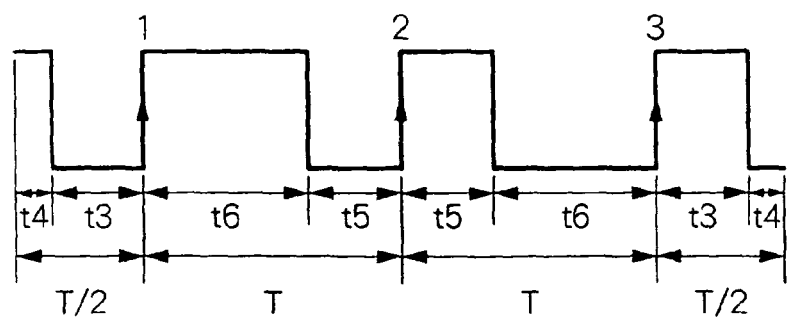
FIG. 3 is a drawing showing an example of waveform C(3) used in the noncontact RF ID system according to the embodiment of the present invention.

Similarly, FIG. 3 shows an example of a waveform C(3), which is assigned in place of three successive waveforms B. This waveform C(3) is a waveform that, in place of three successive waveforms B, maintains a high level state in the positive time direction for t6 from the point in time that the waveform first rises, maintains a low level state in the negative time direction for t3, maintains a high level state for time t4 until the start point of the waveform, maintains a low level state in the negative time direction for t5 from the point in time that the waveform rises for the second time, maintains a high level state in the positive time direction for time t5, maintains a low level state in the negative time direction for t6 from the pint in time that the waveform rises the last time, maintains a high level state in the positive time direction for time t3, and maintains a low level state for time t4 until the end point of the waveform.

It is assumed that t3+t4=T/2 and t5+t6=T, and by assigning a waveform C(3) in place of three successive waveforms B at the transmitting side, a rising transition does not occur at the junction between waveforms, and thus it is possible to make an association between the rising timing and a unit of data. Therefore, by using a circuit that detects the rising transition, it is possible to generate easily a clock signal that is in synchronism with the data.

Figure 4:
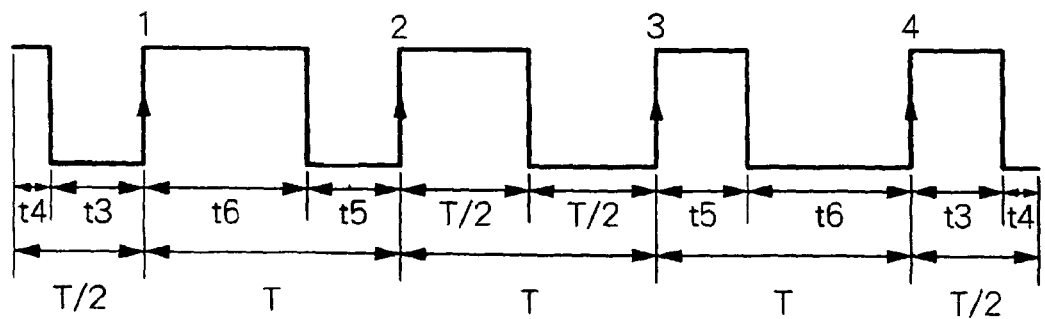
FIG. 4 is a drawing showing an example of waveform C(4) used in the noncontact RF ID system according to the embodiment of the present invention.

Similarly, FIG. 4 shows an example of waveform C(4) assigned in place of four successive waveforms B. The waveform C(4) is a waveform that, in place of four successive waveforms B, maintains a high level state in the positive time direction for t6 from the point in time that the waveform first rises, maintains a low level state in the negative time direction for t3, maintains a high level state for time t4 until the start point of the waveform, maintains a low level state in the negative time direction for t5 from the point in time that the waveform rises for the second time, maintains a high level state in the positive time direction for time T/2, maintains a low level state in the negative time direction for T/2 from the point in time that the waveform rises for the third time, maintains a high level state in the positive time direction for time t5, maintains a low level state in the negative time direction for t6 from the point in time the waveform rises the last time, maintains a high level state in the positive time direction for time t3, and maintains a low level state for time t4 until the end point of the waveform.

It is assumed that t3+t4=T/2 and t5+t6=T, and by assigning a waveform C(4) in place of four successive waveforms B on the transmitting side, no rising transition occurs at the junction between the waveforms, and thus it becomes possible to associate a rising timing with a unit of data. Thus, by using a circuit that detects a rising transition, it is possible to generate easily a clock signal that is in synchronism with data.

Figure 5:
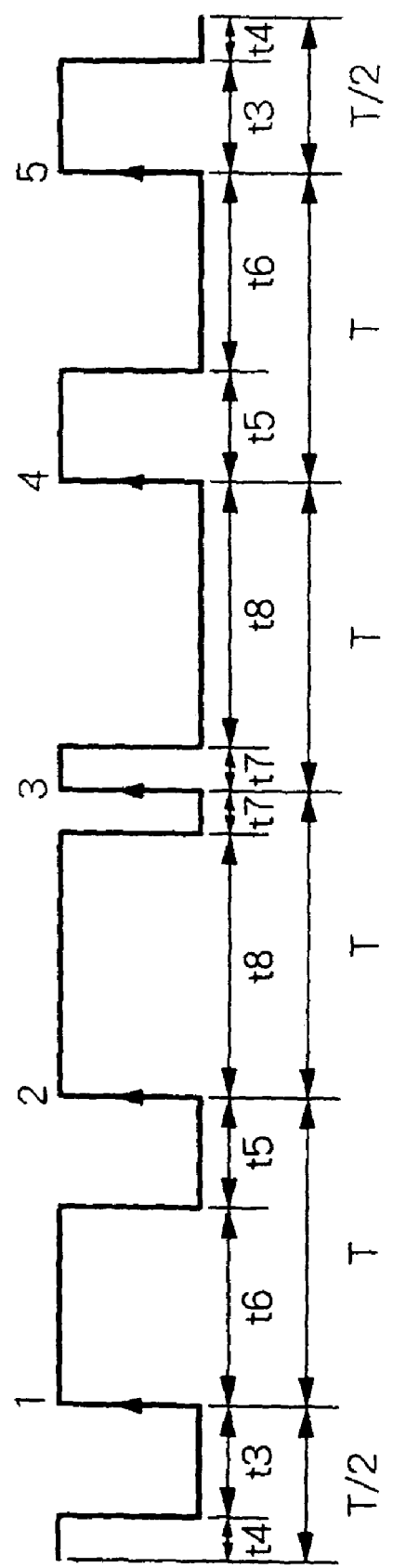
FIG. 5 is a drawing showing an example of waveform C(5) used in the noncontact RF ID system according to the embodiment of the present invention.

Similarly, FIG. 5 shows an example of a waveform C(5) that is assigned in place of five successive waveforms B. The waveform C(5) is a waveform that, in place of five successive waveforms B, maintains a high level state in the positive time direction for t6 from the point in time that the waveform first rises, maintains a low level state in the negative time direction for t3, maintains a high level state for t4 until the start point of the waveform, maintains a low level state in the negative time direction for t5 from the point in time that the waveform rises for the second time, maintains a high level state in the positive time direction for time t8, maintains a low level state in the negative time direction for t7 from the point in time that the waveform rises for the third time, maintains a high level state in the positive time direction for time t7, maintains a low level state in the negative time direction for t8 from the point in time that the waveform rises for the fourth time, maintains a high level state in the positive time direction for t5, maintains a low level state in the negative time direction for t6 from the point in time that the waveform rises the last time, maintains a high level state in the positive time direction for t3, and maintains a low level state for time t4 until the end point of the waveform.

It is assumed that t3+t4=T/2, t5+t6=T, and t7+t8=T, and by assigning a waveform C(5) in place of five successive waveforms B at the transmission side, no rising transition occurs at the junction between the waveforms, and it is possible associate a rising timing with a unit of data. Thus, by using a circuit that detects a rising transition, it is possible to generate easily a clock signal that is in synchronism with data.

Figure 6:
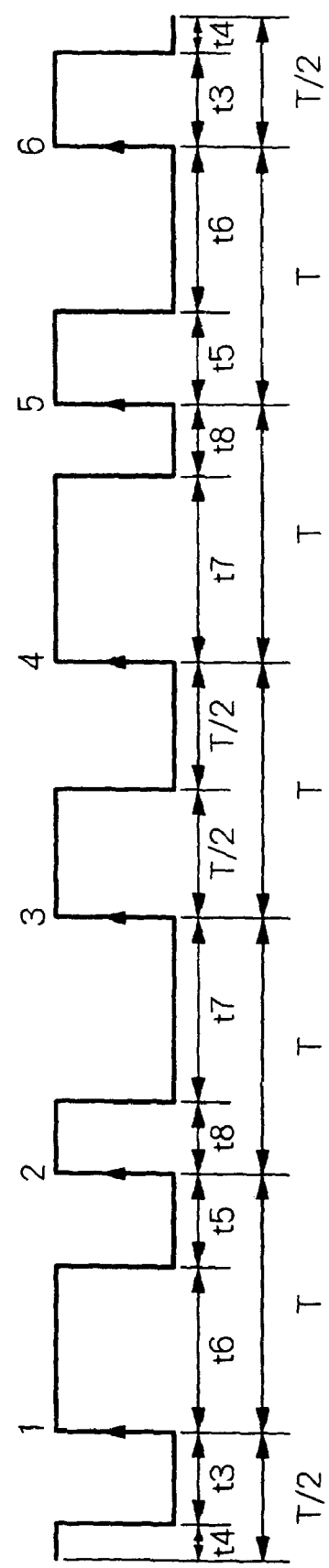
FIG. 6 is a drawing showing an example of waveform C(6) used in the noncontact RF ID system according to the embodiment of the present invention.

Similarly, FIG. 6 shows an example of a waveform C(6) that is assigned in place of six successive waveforms B. The waveform C(6) is a waveform that, in place of six successive waveforms B, maintains a high level state in the positive time direction for t6 from the point in time that the waveform first rises, maintains a low level state in the negative time direction for t3, maintains a high level state for time t4 until the start point of the waveform, maintains a low level state in the negative time direction for t5 from the point in time that the waveform rises for the second time, maintains a high level state in the positive time direction for time t8, maintains a low level state in the negative time direction for t7 from the point in time that the waveform rises for the third time, maintains a high level state in the positive time direction for time T/2, maintains a low level state in the negative time direction for T/2 from the point in time that the waveform rises for the fourth time, maintains a high level state in the positive time direction for t7, maintains a low level state in the negative time direction for time t8 from the point in time that the waveform rises for the fifth time, maintains a high level state in the positive time direction for time t5, maintains a low level state in the negative time direction for t6 from the point in time that the waveform rises the last time, maintains a high level state in the positive time direction for time t3, and maintains a low level state for time t4 until the end point of the waveform.

It is assumed that t3+t4 T/2, t5+t6=T, and t7+t8=T, and by assigning a waveform C(6) at the transmitting side in place of six successive waveforms B, no rising transition occurs at the junction between waveforms, and thus it is possible to associate a rising timing with a unit of data. Thus, by using a circuit that detects a rising transition, it is possible to generate easily a clock signal that is in synchronism with data.

Figure 7:
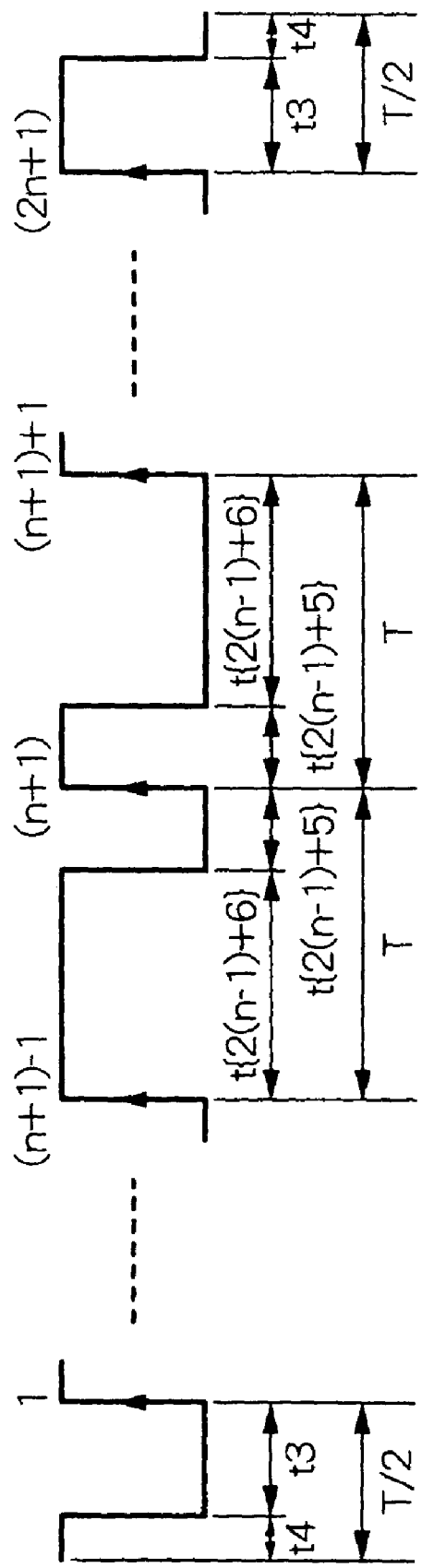
FIG. 7 is a drawing showing an example of waveform C(2n+1) used in the noncontact RF ID system according to the embodiment of the present invention.

Extending this further, FIG. 7 shows an example of a waveform C(2n+1), which is assigned in place of (2n+1) successive waveforms B (where n is a natural number).

The waveform C(2n+1) is a waveform that, in place of (2n+1) successive waveforms B, maintains a high level state in the positive time direction for t6 from the point in time that the waveform first rises, maintains a low level state in the negative time direction for t3, maintains a high level state for time t4 until the starting point of the waveform, maintains a high level state in the positive time direction for t{2(n−k)+6} from the point in time that the waveform rises for the (n+1−k)th time, maintains a low level state in the negative time direction for t{2(n−k)+3}, maintains a high level state in the positive time direction for t{2(n−1)+5} from the point in time that the waveform rises for the (n+1)th time, maintains a low level state in the negative time direction for t{2(n−1)+5}, maintains a high level state in the positive time direction for t{2(n−k)+3} from the point in time that the waveform rises for the (n+1+k)th time, maintains a low level state in the negative time direction for t{2(n−k)+6}, maintains a low level state in the negative time direction for t6 form the point in time that the waveform rises the last time, maintains a high level state in the positive time direction for time t3, and maintains a low level state for time t4 until the end point of the waveform.

It is assumed that n≧k≧1, t3+t4=T/2, and t{2(n−k)+5}+t{2(n−k)+6}=T (where k is a natural number), and by assigning a waveform C(2n+1) in place of (2n+1) successive waveforms B at the transmitting side, no rising transition occurs at the junction between the waveforms, and thus it is possible to associate a rising timing with a unit of data. Therefore, by using a circuit that detect a rising waveform, it is possible to generate easily a clock signal that is in synchronism with the data.

Figure 8:
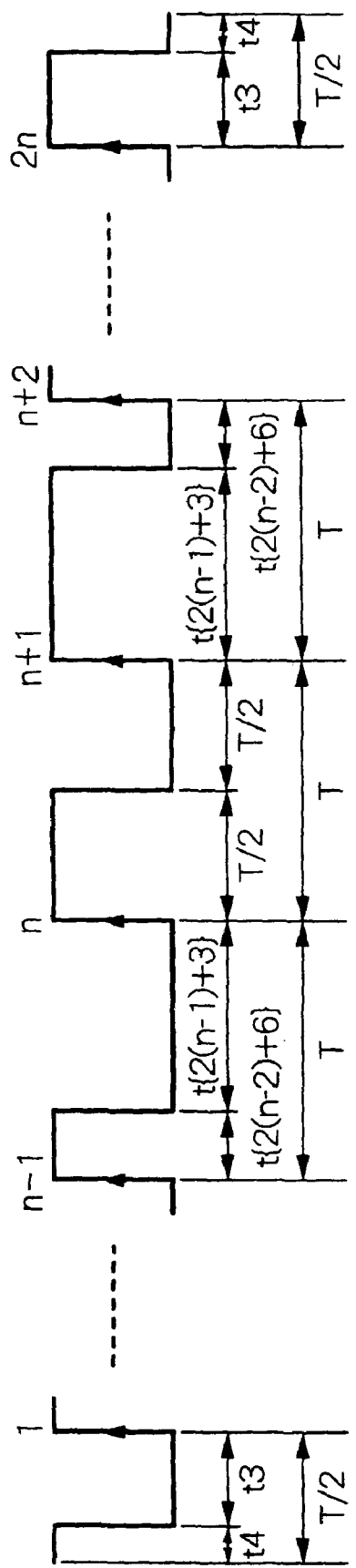
FIG. 8 is a drawing showing an example of waveform C(2n) used in the noncontact RF ID system according to the embodiment of the present invention.

Next, FIG. 8 shows an example of a waveform C(2n), which is assigned in place of (2n) successive waveforms B (where n is a natural number).

The waveform C(2n) is a waveform that, in place of (2n) successive waveforms B, maintains a high level state in the positive time direction for t6 from the point in time that the waveform first rises, maintains a low level state in the negative time direction for t3, maintains a high level state for t4 until the starting point of the waveform, maintains a high level state in the positive time direction for t{2(n−k)+6} from the point in time that the waveform rises for the (n+1−k)th time, maintains a low level state in the negative time direction for t{2(n−k)+3}, maintains a high level state in the positive time direction for T/2 from the point in time that the waveform rises for the nth time, maintains a low level state in the negative time direction for t{2(n−1)+3}, maintains a high level state in the positive time direction for t{2(n−1)+3} from the point in time that the waveform rises for the (n+1)th time, maintains a low level state in the negative time direction for T/2, maintains a high level state in the positive time direction for t{2(n−k)+3} from the point in time that the waveform rises for the (n+k)th time, maintains a low level state in the negative time direction for t{2(n−k)+6}, maintains a low level state in the negative time direction for t6 from the point in time that the waveform rises the last time, maintains a high level state in the positive time direction for time t3, and maintains a low level state for time t4 until the end point of the waveform.

It is assumed that n≧k≧1, t3+t4=T/2, and t{2(n−k)+5}+t{2(n−k)+6}=T (where n and k≧2 and k is a natural number), and by assigning a waveform C(2n) in place of (2n) successive waveforms B at the transmitting side, no rising transition occurs at the junction between the waveforms, and thus it is possible to associate a rising timing and a unit of data. Thus, by using a circuit that detects a rising transition, it is possible to generate easily a clock signal that is in synchronism with data.

Figure 9A:
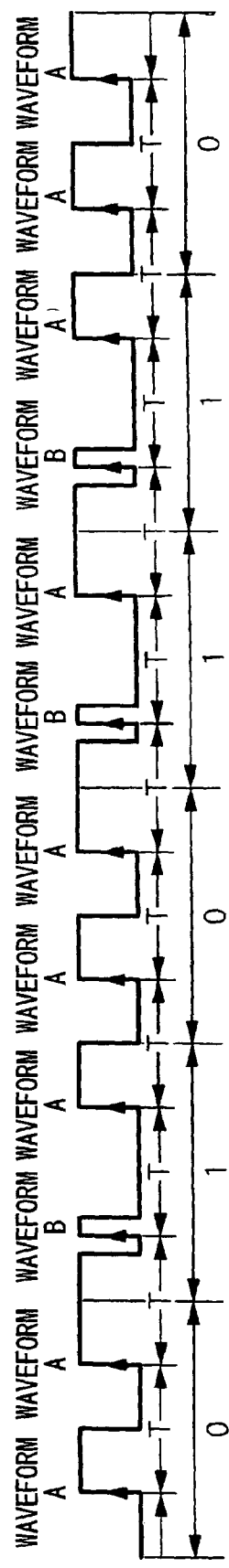
FIGS. 9A and 9B are comparative examples of code in the case of using another conventional example and the present embodiment.
Figure 9B:
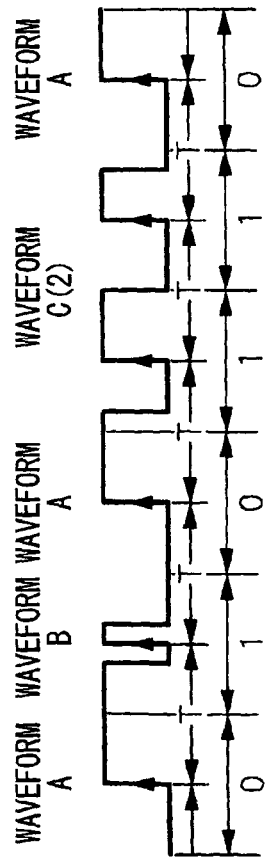

Next, FIGS. 9A and 9B show a comparative example of the code length in the case in which communication is carried out with a noncontact RF ID system that uses another conventional example and the noncontact RF ID system of the present embodiment. By using the present embodiment, it is possible to reduce by half the code length when using the communication method of another conventional example, and thereby it is possible to realize an improvement in transmission efficiency due to encoding.

Figure 10:
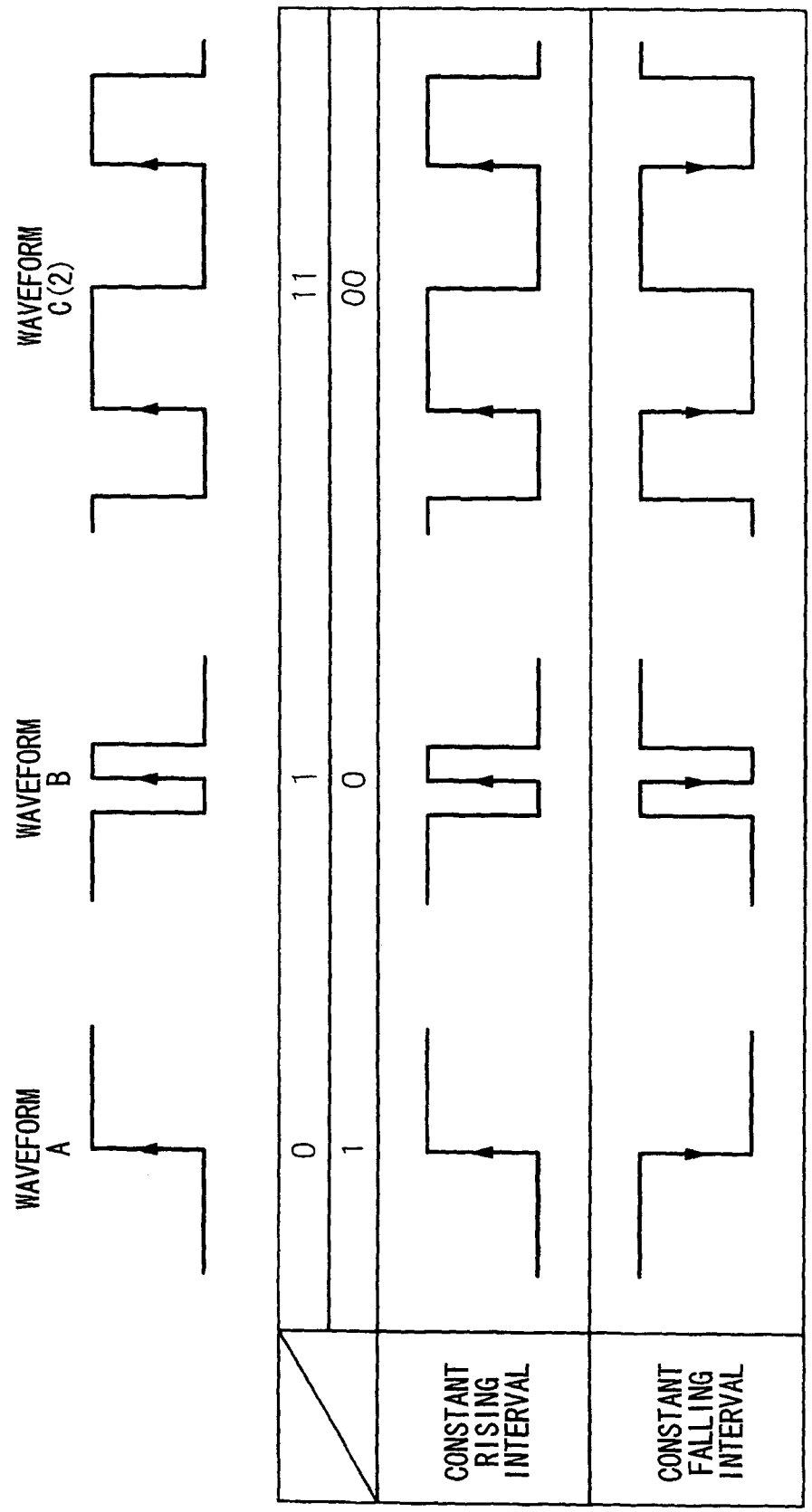
FIG. 10 is a drawing showing an example of the combination of code used in the noncontact RF ID system according to the embodiment of the present invention.

As shown in FIG. 10, the combination of waveforms A and B can bring about a wide variation by replacing the waveforms A and B. According to the present embodiment, it is possible to send the information of the codes "1" and "0" simultaneously while the interval of the rising or falling timing is made equal. If the state transition generated at equal intervals is used as a trigger, it is possible to obtain a clock that is in synchronism with data easily without using a phase locked loop.

In the present embodiment, waveforms that are completely right-left symmetrical are used for each of the waveforms A, B, and C, but when constructing an actual circuit, because of influences such as delay characteristics of each of the circuits used for demodulation, time constants and the like, it is not always necessary to use completely right-left symmetric waveforms. A waveform in which the rising and falling timings are substantially constant and the duty ratio is maintained at approximately 50% can be used. In this case, it is possible to minimize the errors due to amplitude fluctuation.

The embodiment described above illustrates the present invention, but does not limit the present invention. The present invention can be implemented by various other modifications and alterations. For example, in addition to amplitude modulation it is possible to use frequency modulation or phase modulation as a modulation method. In addition, it is also possible to use a modulation method that is a combination of amplitude modulation, frequency modulation, and phase modulation. Furthermore, the security may be improved with respect to tapping and impersonation by encrypting the signal sequence, and encoding may be carried out with the object of error detection and error correction.

INDUSTRIAL APPLICABILITY

In the present invention, a first waveform and a second waveform are formed by basic waveforms having one of rising or falling state transitions at the approximate center part of the waveform, and a third waveform is formed by a plurality of basic waveforms having one state transition at the approximate center part of the waveforms. A state transition in the third waveform is generated only at the approximate center part of the plurality of basic waveforms, and when communication is carried out by using the first waveform and the second waveform, in the case in which one state transition is generated outside the approximate center part of the waveform (for example, the case of successive second waveforms), transmission is carried out by assigning the third waveform that does not generate a rising (or falling) state transition at the junction between the waveforms on the transmission side in place of the successive second waveforms, and at the reception side, when the third waveform has been received, demodulation is carried out by recognizing the reception of the successive second waveforms.

Therefore, it is possible to assign the first waveform and the second waveform separately to codes "0" and "1", and thus it is possible to associate a rising (or falling) timing with a unit of data, it is possible to reduce by half the code length in comparison with the case using the another conventional communication method, and improvement in transmission efficiency due to the encoding can be realized.

When using a circuit that detects a rising transition or falling transition, it is possible to generate easily a clock signal that is in synchronism with data. Therefore, if the state transition generated at equal intervals is used as a trigger, it is possible to obtain easily a clock that is in synchronism with data without using a phase locked loop.

According to the present invention, improvement in the transmission efficiency due to encoding can be realized without using a plurality of phase locked loops and reference circuits, and it is possible to realize a communication method for a noncontact RF ID system, a noncontact RF ID system, and a transmitter and receiver.

The invention claimed is:

1. A communication method for a noncontact RF ID system comprising:
   communicating a data sequence having a first waveform which corresponds to one of codes "0" or "1" and which has a length of time T;
   communicating a data sequence having a second waveform which corresponds to the other of said codes "0" or "1" and which has a length of time T;
   communicating a data sequence having a third waveform which corresponds to m (m is a natural number equal to or greater than 2) codes that are the same as the codes of the second waveform and where the third waveform has a length of time mT, wherein
      the first waveform with 50% duty ratio is in a low level state at a starting point, is in a high level state at an end point and rises only at a position of T/2,
      the second waveform with 50% duty ratio is in a high level state at a starting point, is in a low level state at an end point and rises only at a position of T/2, and
      the third waveform with 50% duty ratio is in a high level state at a starting point, is in a low level state at an end point and rises only at a total of m positions of T/2+nT (n=0 . . . , m−1); and
   replacing consecutive instances of the second waveform in the data sequence with the third waveform when the second waveform occurs consecutively in the data sequence, where the data sequence is communicated from a transmitting device to a receiving device.

2. A communication method for a noncontact RF ID system comprising:
   communicating a data sequence having a first waveform which corresponds to one of codes "0" or "1" and which has a length of time T;
   communicating a data sequence having a second waveform which corresponds to one of codes "0" or "1" opposite to the first waveform and which has a length of time T;
   communicating a data sequence having a third waveform which corresponds to m (m is a natural number equal to or greater than 2) codes that are the same as the codes of the second waveform and which has a length of time mT, wherein
      the first waveform with 50% duty ratio is in a high level state at a starting point, is in a low level state at an end point and falls only at a position of T/2,
      the second waveform with 50% duty ratio is in a low level state at a starting point, is in a high level state at an end point and falls only at a position of T/2, and
      the third waveform with 50% duty ratio is in a low level state at a starting point, is in a high level state at an end point and falls only at a total of m positions of T/2+nT (n=0 . . . , m−1); and
   replacing consecutive instances of the second waveform in the data sequence with the third waveform when the second waveform occurs consecutively in the data sequence where the data sequence is communicated from a transmitting device to a receiving device.

3. A communication method for a noncontact RF ID system according to claim 1, wherein:
   in the case in which the state transition is rising, the first waveform is a waveform that maintains a low level in a negative time direction for T/2 from the point in time that the waveform first rises, which is a center point of the waveform, and maintains a high level state for T/2 in a positive time direction from this center point;
   the second waveform is a waveform that maintains a high level state in the positive time direction for t1 from a point in time that the waveform first rises, which is the center point of the waveform, maintains a low level state for time t2 until an end point of the waveform, maintains a low level state in the negative time direction for time t1 from the center point of the waveform, and maintains a high level state for time t2 until a starting point of the waveform (here, t denotes time, T denotes one cycle of the first and second waveforms, and t1+t2=T/2); and the third waveform is a C(2n) waveform which, in the case in which m=2n, maintains a high level state in the positive time direction for t6 from the point in time that the waveform first rises; maintains a low level state in the negative time direction for t3 from the point in time that the waveform first rises; maintains a high level state for time t4 until the starting point of the waveform; maintains a high level state in the positive time direction for t{2(n−k)+6} from the point in time that the waveform rises for the (n+1−k)th time; maintains a low level state for t{2(n−k)+3} in the negative time direction from the point in time that the waveform rises for the (n+1−k)th time; maintains a high level state in the positive time direction for T/2 from the point in time that the waveform rises for the nth time; maintains a low level state in the negative time direction for t{2(n−1)+3} from the point in time that the waveform rises for the nth time; maintains a high level state in the positive time direction for t{2(n−1)+3} from the point in time that the waveform rises for the (n+1)th time; maintains a low level state in the negative time direction for T/2 from the point in time that the waveform rises for the (n+1)th time; maintains a high level state in the positive time direction for t{2(n−k)+3} from the point in time that the waveform rises for the (n+k)th time; maintains a low level state in the negative time direction for t{2(n−k)+6} from the point in time that the waveform rises for the (n+k)th time; maintains a low level state in the negative time direction for t6 from the point in time that the waveform rises the last time; maintains a high level state in the positive time direction for t3 from the point in time that the waveform rises the last time; and maintains a low level state for time t4 until an end point of the waveform, where n and k are natural numbers; n≧k≧1; t is time; T is one cycle of the first and second waveforms; and t3+t4=T/2; t{2(n−k)+5}+t{2(n−k)+6}=T (when n and k≧2); and in the case in which m=2n+1, the third waveform is a C(2n+1) waveform that maintains a high level state in the positive time direction for t6 from the point in time that the waveform first rises; maintains a low level state in the negative time direction for t3 from the point in time that the waveform first rises; maintains a high level state for t4 from the starting point of the waveform; maintains a high level state in the positive time direction for t{2(n−k)+6} from the point in time that the waveform rises for the (n+1−k)th time; maintains a low level state in the negative time direction for t{2(n−k)+3} from the point in time that the waveform rises for the (n+1−k)th time; maintains a high level state in the positive time direction for t{2(n−1)+5} from the point in time that the waveform rises for the (n+1)th time; maintains a low level state in the negative time direction for t{2(n−1)+5} from the point in time that the waveform rises for the (n+1)th time; maintains a high level state in the positive time direction for t{2(n−k)+3} from the point in time that the waveform rises for the (n+1+k)th time; maintains a low level state in the negative time direction for t{2(n−k)+6} from the point in time that the waveform rises for the (n+1+k)th time; maintains a low level state in the negative time direction for t6 from the point in time that the waveform rises the last time; maintains a high level state in the positive time direction for time t3 from the point in time that the waveform rises the last time; and maintains a low level state for t4 until the end point of the waveform; (where n and k are natural numbers, n≧k≧1, t is time, T is one cycle of the first and second waveforms, t3+t4=T/2, and t{2(n−k)+5}+t{2(n−k)+6}=T).

4. A communication method for a noncontact RF ID system according to 2, wherein:

in the case in which the state transition is a falling state transition, the first waveform is an inverted waveform that maintains a low level in a negative time direction for T/2 from the point in time that the waveform first rises, which is a center point of the waveform, and maintains a high level state for T/2 in the positive time direction from this center point;

the second waveform is an inverted waveform that maintains a high level state in the positive time direction for t1 from the point in time that the waveform first rises, which is the center point of the waveform, maintains a low level state for time t2 until the end point of the waveform, maintains a low level state in the negative time direction for time t1 from the center point of the waveform, and maintains a high level state for time t2 until the starting point of the waveform (here, t denotes time, T denotes one cycle of the first and second waveforms, and t1+t2=T/2); and the third waveform is an inverted C(2n) waveform which, in the case in which m=2n, maintains a high level state in a positive time direction for t6 from the point in time that the waveform first rises; maintains a low level state in the negative time direction for t3 from the point in time that the waveform first rises; maintains a high level state for time t4 until the starting point of the waveform; maintains a high level state in the positive time direction for t{2(n−k)+6} from the point in time that the waveform rises for the (n+1−k)th time; maintains a low level state for t{2(n−k)+3} in the negative time direction from the point in time that the waveform rises for the (n+1−k)th time; maintains a high level state in the positive time direction for T/2 from the point in time that the waveform rises for the nth time; maintains a low level state in the negative time direction for t{2(n−1)+3} from the point in time that the waveform rises for the nth time; maintains a high level state in the positive time direction for t{2(n−1)+3} from the point in time that the waveform rises for the (n+1)th time; maintains a low level state in the negative time direction for T/2 from the point in time that the waveform rises for the (n+1)th time; maintains a high level state in the positive time direction for t{2(n−k)+3} from the point in time that the waveform rises for the (n+k)th time; maintains a low level state in the negative time direction for t{2(n−k)+6} from the point in time that the waveform rises for the (n+k)th time; maintains a low level state in the negative time direction for t6 from the point in time that the waveform rises the last time; maintains a high level state in the positive time direction for t3 from the point in time that the waveform rises the last time; and maintains a low level state for time t4 until the end point of the waveform, where n and k are natural numbers; n≧k≧1; t is time; T is one cycle of the first and second waveforms; and t3+t4=T/2; t{2(n−k)+5}+t{2(n−k)+6}=T (when n and k≧2); and in the case in which m=2n+1, the third waveform is an inverted C(2n+1) waveform that maintains a high level state in the positive time direction for t6 from the point in time that the waveform first rises; maintains a low level state in the negative time direction for t3 from the point in time that the waveform first rises; maintains a high level state for t4 from the starting point of the waveform; maintains a high level state in the positive time direction for t{2(n−k)+6} from the point in time that the waveform rises for the (n+1−k)th time; maintains a low level state in the negative time direction for t{2(n−k)+3} from the point in time that the waveform rises for the (n+1−k)th time; maintains a high level state in the positive time direction for t{2(n−1)+5} from the point in time that the waveform rises for the (n+1)th time; maintains a low level state in the negative time direction for t{2(n−1)+5} from the point in time that the waveform rises for the (n+1)th time; maintains a high level state in the positive time direction for t{2(n−k)+3} from the point in time that the waveform rises for the (n+1+k)th time; maintains a low level state in the negative time direction for t{2(n−k)+6} from the point in time that the waveform rises for the (n+1+k)th time; maintains a low level state in the negative time direction for t6 from the point in time that the waveform rises the last time; maintains a high level state in the positive time direction for time t3 from the point in time that the waveform rises the last time; and maintains a low level state for t4 until the end point of the waveform; (where n and k are natural numbers, n≧k≧1; t is time, T is one cycle of the first and second waveforms, and t3+t4=T/2, and t{2(n−k)+5}+t{2(n−k)+6}=T).

* * * * *